W. A. STEWART.
SUBMARINE DETECTOR.
APPLICATION FILED MAR. 12, 1917.

1,242,386.

Patented Oct. 9, 1917.
2 SHEETS—SHEET 1.

W. A. STEWART.
SUBMARINE DETECTOR.
APPLICATION FILED MAR. 12, 1917.
1,242,386.
Patented Oct. 9, 1917.
2 SHEETS—SHEET 2.
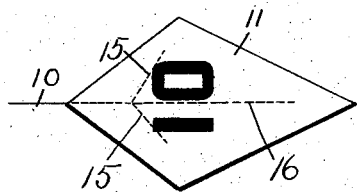
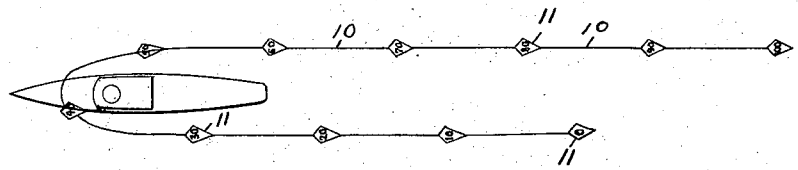
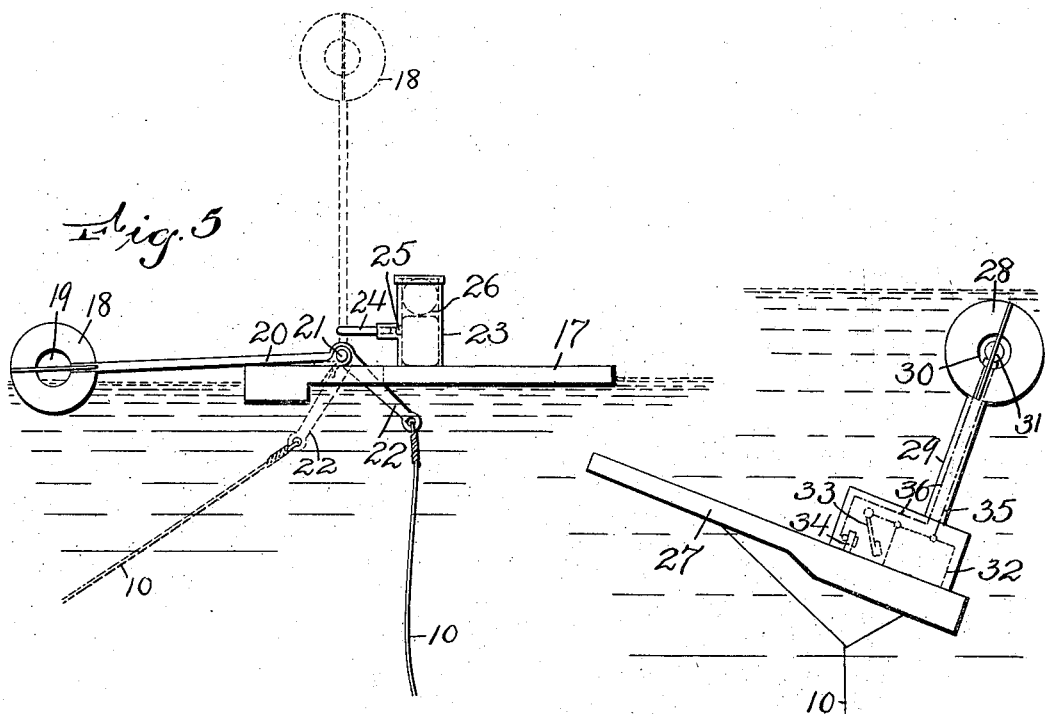
INVENTOR
William A. Stewart,
BY
Wm. H. Canfield.
ATTORNEY

UNITED STATES PATENT OFFICE.

WILLIAM A. STEWART, OF EAST ORANGE, NEW JERSEY.

SUBMARINE-DETECTOR.

1,242,386.  Specification of Letters Patent.  Patented Oct. 9, 1917.

Application filed March 12, 1917. Serial No. 154,364.

*To all whom it may concern:*

Be it known that I, WILLIAM A. STEWART, a citizen of the United States, and a resident of East Orange, county of Essex, and State of New Jersey, have invented certain new and useful Improvements in Submarine-Detectors, of which the following is a specification.

This invention relates to a device for detecting submarines, particularly when they are submerged, and is designed to provide a cheap and easily manufactured detector that is simple so as to insure its operation.

The invention relates further to a detector that indicates the position and course of a submarine after the submarine has engaged the detector.

The detector comprises a submerged device which is preferably a net, and it has means for preventing it from drifting and it is also provided with indicators that are inconspicuous when the net is stationary, but become conspicuous when the net is moved by a submarine engaging the net and carrying the net along with it.

The invention can also be utilized for the displaying of lights, the discharge of smoke or illuminating bombs and for the operation of similar warnings when the net is shifted from the position in which it is moored or otherwise detachably secured.

The invention is subject to many changes as to details, but to clearly illustrate the nature of the present invention the accompanying drawings illustrate the device with several modifications.

In said drawings, Figure 1 is a face view of the net in position. Fig. 2 illustrates the net displaced and being carried along or towed by a moving submarine, showing how the indicators at the surface become conspicuous. Fig. 3 is a top view of one form of float employed in the device. Fig. 4 is a reduced plan view of a submarine and the floats trailing behind to indicate the position and direction of the craft. Fig. 5 is a side view of a modified form of float or indicator, and Fig. 6 is a similar view of a further modification.

I prefer to use, as a submerged device of considerable area, a net made up of wires 10, the wires 10 forming the body portion of the net and arranged in any desired mesh and of any size mesh, but I illustrate simply horizontal and vertical wires. The wires can be placed as far apart as desired, say, for instance, ten yards, but this distance can be varied. The wires may be covered, if desired, with a light covering to make them somewhat buoyant and to prevent undue sagging. The net extends to the desired depth usually, in channels, close to the bottom thereof. In some places the nets can be isolated and in other situations can be made say, half a mile long and arranged end to end to cover a large area. The net is supported by suitable floats 11 which hold the net at the proper depth and also act as indicators when the net is moved. The details of some forms of these floats will be described hereinafter.

The net is fastened in place by means sufficient to prevent drifting, but said means is calculated to release the net under strains in excess of that of currents or contact of light drifting bodies. The mooring or fastening means can be attached to shore or shallow places in narrow channels or in such locations, or in wider space the net can be moored to the bottom. Such mooring kedges or anchors are shown at 12 and they are connected to the net by suitable means, such as the wires 13. The net can be enlarged as to its mesh near the surface to permit the passage of vessels 14 on the surface, and small vessels can pass between or through the floats without disturbing the net. The vertical wires can be lengthened, if desired, to bring the wire $10^a$ sufficiently below the surface to permit boats not submerged to pass over it, especially in thoroughfares for shipping. The floats are used to indicate when the net is moved by being torn from its moorings and towed by a submerged submarine.

One form of float is shown in Figs. 1 to 4, inclusive, as kite-shaped or similarly shaped floats constructed so that when under way they throw the water or otherwise make a commotion to be easily seen by either a shore observer or by guard vessels. Such float when under way may throw a spray as in Fig. 2, and a series of these floats under way make a defined row of disturbances easily detected. The showing in Fig. 2 illustrates how the net is carried along by the submarines and the floats at the surface show both the direction and location of the submarine. This is also clearly apparent from Fig. 4. The floats can be made of wood or other suitable buoyant material, or they can be made of metal and hollow so as to form air chambers. The floats are inconspicuous when at rest and are thus preferably made of a generally flat shape.

The floats are preferably marked with identifying devices, such as numbers, so that a submarine chaser or similar craft, in picking up or following the floats, at once calculates, from the numbers on the floats adjacent the shorter end of the tailing line of floats, how far to the front the submarine is. For instance, in Fig. 4 the float marked zero is opposite 80 so that half of this is 40 which, if the floats are ten yards apart, indicates that the submarine is about 40 yards ahead. In long nets this finding means is particularly advantageous. The net can be joined at the back by the rear floats to surround the submarine and by a resistance or by going astern can pull on the net to cause an upward tilting of the submarines bow and so bring it to the surface in spite of or before the operation of diving mechanism to counteract it. The floats can have highly polished or reflective top surfaces to make them easier to see when they are under way. To cause such tilting suitable rigging can be used, a kite rig being shown in Fig. 3, the two breast strands 15 and the rear strand 16 acting to hold the float at an angle when it is pulled along the surface of the water.

A modified form of float is shown in Fig. 5, the float having a buoyant body portion which has attached thereto a mechanical indicator which is operated when the float is towed. The indicator consists of an easily seen signal as at 18 which can be made of two disks of metal placed at right-angles to each other as in switch signals and cut away as at 19 to cut down the wind resistance. This signal is on a rod 20 pivoted at 21 to the float and lying normally horizontal or substantially so. An extension 22 on the rod 20 is fastened to one of the wires 10 as shown. When the wire is pulled to tow the float, the rod 20 is raised and the signal is elevated to a position where it is easily seen. A catch to hold it up can be used, if desired. I also illustrate in this figure another form of signal operated in this case by the rod 20. A suitable mortar or gun 23 is placed so that firing pin 24 thereof is struck by the rod 20 and sets off the charge in the mortar either electrically or by means of the percussion cap 25 so as to expel the bomb 26 which can either be a smoke bomb or an illuminating bomb or both.

Another form of float is shown in Fig. 6 and is preferably used at the ends of the net as shown in Fig. 1. This float is held under the surface by the net when stationary, and is secured or balanced so that it is inclined, but when towed, it rises to the surface and becomes more nearly level. The float has a body portion 27 with a suitable signal, as 28, on a standard 29 so that the signal 28 is seen when the float moves. The signal 28 is cut away as at 30, or otherwise equipped to receive an electric light 31 which is lighted when the float becomes horizontal by being released. One form of lighting mechanism consists of a source of current as a battery 32, and a switch 33 which is a weighted lever hanging out of contact with the terminal 34 when the float is tilted. The switch, the terminal, the battery and the light are connected to the circuit wires 35 and 36, and the light 31 is lighted when the lever 33 swings against the terminal 34. The light 31 can have a distinctive color to permit it to be identified quickly.

The nets can be made large in area and the floats placed a considerable distance apart, if desired. Another advantage is that the nets can be taken up easily and easily placed in new positions.

If a submarine strikes a net and attempts to back out or release itself without coming to the surface, it will be unable to do so, as under speed the ends of the net come together and the net encircles the boat. A speedy boat can attach itself to the floats or nets when chasing a submarine and be towed around by the submarine and fire bombs which would explode in the vicinity or against the submarine. The floats can have their bottom surfaces constructed so as to ruffle the surface of the water when they are in motion.

Having thus described my invention, I claim:

1. A submarine detector comprising a submerged device, and a series of indicators attached thereto, said indicators being inconspicuous when at rest and constructed so as to change their positions relative to the surface of the water when the floats are towed by the device.

2. A submarine detector comprising a submerged device of considerable area, means for mooring the device to prevent drifting, and a series of indicators operative when the submerged device is engaged by a moving body.

3. A submarine detector comprising a submerged device of considerable area, means for mooring the device sufficient to prevent drifting, and a series of floats connected to the device and inconspicuous when moored but conspicuous when the device is engaged by a moving body and the floats are towed by the device.

4. A submarine detector comprising a submerged net moored so as to prevent drifting but adapted to be released by pressure of a submarine, and a series of floats connected to the net and having means thereon to indicate movement of the net.

5. A submarine detector comprising a net having a series of floats connected to it, said floats having means thereon for visually indicating exceptional movement of the net.

6. A submarine detector comprising a net, means for preventing the net from drifting, and a series of floats connected to the net and constructed so as to be inconspicuous when at rest and to cause a commotion in the water when the net is removed from its position by a moving body in the water.

7. A submarine detector comprising a flexible net, and a series of separated floats connected to the net and constructed so as to define by a series of commotions on the surface of the water the location and direction of a submarine engaging and towing the net.

8. A submarine detector comprising a flexible net, and a series of separated and properly identified floats connected to the net and constructed so as to define by a series of commotions on the surface of the water the location and direction of a submarine engaging and towing the net.

In testimony that I claim the foregoing, I hereto set my hand, this 10th day of March, 1917.

WILLIAM A. STEWART.

Copies of this patent may be obtained for five cents each, by addressing the "Commissioner of Patents, Washington, D. C."